United States Patent [19]

Douglas

[11] 4,131,298
[45] Dec. 26, 1978

[54] COMBINED ARM AND LEG REST FOR DRIVERS

[76] Inventor: Ulysee Douglas, 3203 W. Vernon Ave., Los Angeles, Calif. 90008

[21] Appl. No.: 804,717

[22] Filed: Jun. 8, 1977

[51] Int. Cl.² ............................................. B60R 27/00
[52] U.S. Cl. ................................................. 280/727
[58] Field of Search ................. 280/727; 297/423, 437

[56] References Cited
U.S. PATENT DOCUMENTS

| 1,740,267 | 12/1929 | Remington | 280/727 |
|---|---|---|---|
| 1,986,555 | 1/1935 | Carlson | 280/727 |
| 2,133,443 | 10/1938 | Girl | 280/727 |
| 2,491,009 | 12/1949 | Lawrence | 280/727 |
| 2,592,045 | 4/1952 | LeMoir | 280/727 |

Primary Examiner—Robert R. Song
Attorney, Agent, or Firm—Howard I. Podell

[57] ABSTRACT

A combined arm and leg rest for drivers including a clamping member secured at one end to a dashboard and holding the upper part of a padded cushion member extending obliquely toward the driver's leg for the purpose of sustaining its weight to obviate fatigue. The cushion member has an upper part integral with a padded arm rest fitting on the seat next to the driver.

2 Claims, 3 Drawing Figures

COMBINED ARM AND LEG REST FOR DRIVERS

FIELD OF THE INVENTION

This invention relates to a combination leg and arm rest for motor vehicles and provides a device which may be conveniently installed therein to relieve muscular strain upon the leg of a driver when operating the accelerator of the vehicle and upon his right arm.

STATEMENT OF PRIOR ART

The prior art to which this invention relates is familiar, for example, with U.S. Nos.: 1,525,864; 2,994,365; 3,161,435; 2,935,123 and 1,740,267. However, the devices suggested in the above-mentioned patents differ radically in concept, design and/or operation from the present invention.

The principal object of this invention is to provide a device or article of this character which combines simplicity, strength and durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

BRIEF DESCRIPTION OF THE DRAWINGS

In the accompanying drawing, in which is shown one of the various possible illustrative embodiments of this invention, wherein like reference character identify the same or like parts.

DESCRIPTION OF THE PREFERRED EMBODIMENT

Figure 1:
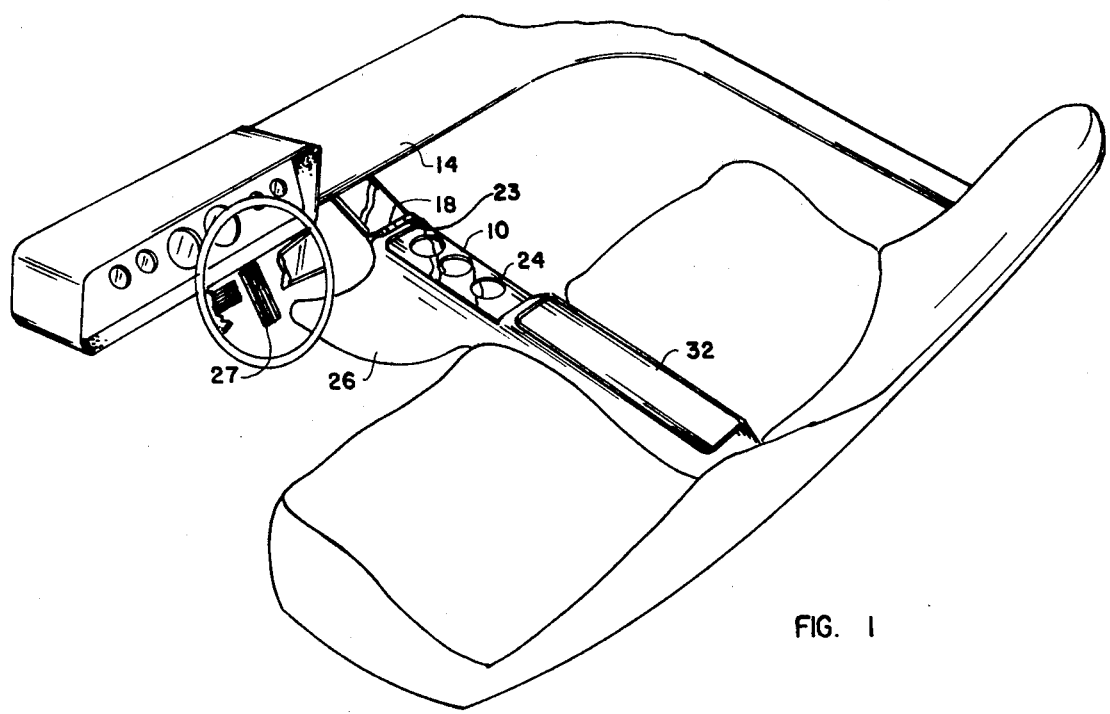
FIG. 1 is an isometric view of the rest of the invention showing same installed in the front of a vehicle.
Figure 2:
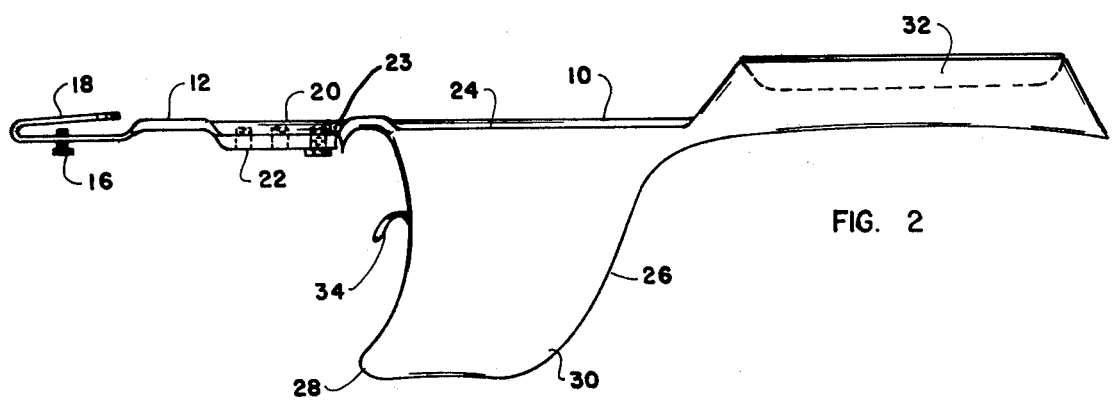
FIG. 2 is a side view thereof.
Figure 3:
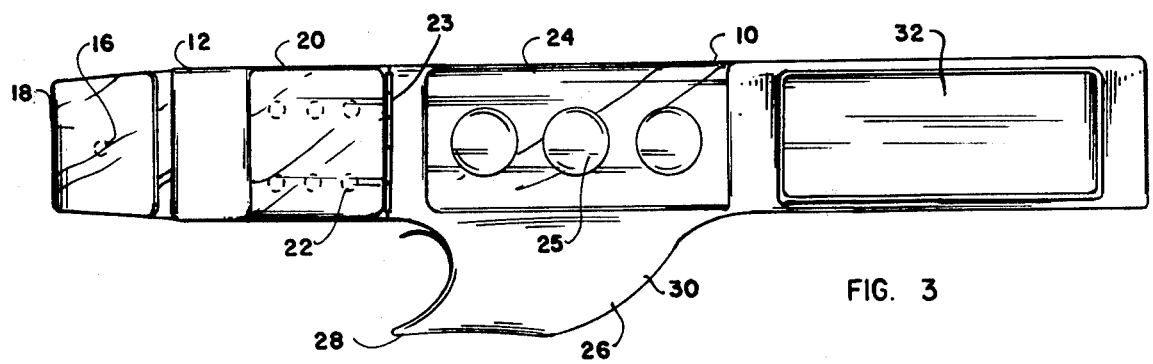
FIG. 3 is a top plan of the same.

With reference to the drawing, there is shown and illustrated a COMBINED LEG AND ARM REST constructed in accordance with the principles of the invention and designated generally by reference character 10. The rest comprises a clamping member 12 of metal or molded plastic which is secured underneath dashboard 14 by screw in bolt 16 fitting in head 18 of clamping member 12. Member 12 has an extension 20. This extension is secured by six bolts 22 with capscrews to the swivel joint 23 of flat plate 24 which allows for adjustments for legs of different lengths in conjunction with the bolts 22. Plate 24 has 3 holes 25 for drinking cups. Fixed to the underside of plate 24 and extending obliquely toward the driver is a padded leg supporting member 26 for sustaining the leg at a point above accelerator pedal 27. The leg supporting member is of a generally parallelopiped configuration with rounded lower front and back portions 28, 30. Padding may be provided by foam rubber or other plastic material.

Detachably secured as by interfitting onto plate 24 is padded arm rest 32.

A stabilizing member 34 on the right side of supporting member 26 fits over the bulge covering the driving shaft.

An alternate way of securing the rest is to fasten the clamping member suitably bent at an angle to the steering wheel column.

The device of the invention has been thoroughly tested under actual use conditions and has been found to be completely successful for the accomplishment of the above stated objects of the invention.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention I claim as new and desire to secure by Letters Patent:

1. A combined leg and arm rest device which is attachable in an automobile to the dashboard of the automobile comprising
   a clamping member adaptable for fastening to a dashboard, said clamping member joined by a swivel joint to a plate member,
   said plate member secured to an arm rest member and secured to a leg support member, with
   said arm rest member extending from the plate member in a direction opposed from said clamping member, and
   said leg supporting member extending, in the installed position, downwardly and towards the normal position of the leg of a driver of the vehicle.

2. The combination as recited in claim 1 further including a stabilizing member fastened to the leg supporting member and shaped so as to fit over a bulge in the floor of the automobile, in the installed position.

* * * * *